T79-123 333 S-
04-17 -E 32,263

United States Patent [19]

Kaminsky

[11] E Patent Number: Re. 32,263

[45] Reissued Date of Patent: Oct. 7, 1986

[54] CHARGE TIME START CONTROL FOR INTERCONNECT PABX

[75] Inventor: Murray F. Kaminsky, Philadelphia, Pa.

[73] Assignee: RCA Corporation, Princeton, N.J.

[21] Appl. No.: 714,457

[22] Filed: Mar. 21, 1985

Related U.S. Patent Documents

Reissue of:

[64] Patent No.: 4,472,600
Issued: Sep. 18, 1984
Appl. No.: 470,573
Filed: Feb. 28, 1983

[51] Int. Cl. ..... H04M 15/18

[52] U.S. Cl. ..... 179/7.1 R

[58] Field of Search ..... 179/7.1 R, 7 R, 7 MM, 179/2 TC, 8 A, 9, 18 AB, 18 AD

[56] References Cited

U.S. PATENT DOCUMENTS

| | | | |
|---|---|---|---|
| 3,721,769 | 3/1973 | Krock et al. | 179/18 AD |
| 4,063,037 | 12/1977 | Heffernan et al. | 179/7.1 R |
| 4,090,034 | 5/1978 | Moylan | 179/7.1 R |
| 4,410,765 | 10/1983 | Hestad et al. | 179/7.1 R |

*Primary Examiner*—Stafford D. Schreyer
*Attorney, Agent, or Firm*—Joseph S. Tripoli; George E. Haas; George J. Seligsohn

[57] ABSTRACT

In an interconnect [PABX], *telephone equipment* which does not have an answer signal returned thereto, decision logic makes use of returned audible busy and ring-back signals to determine if a connection extended through a telephone utility network to a called station is completed.

3 Claims, 3 Drawing Figures

(3)

T379-126
X379-235
X379-257

CHARGE TIME START CONTROL FOR INTERCONNECT PABX

Matter enclosed in heavy brackets [ ] appears in the original patent but forms no part of this reissue specification; matter printed in italics indicates the additions made by reissue.

This invention relates to interconnect private automatic branch exchanges (PABX) and, more particularly, to an improved technique for determining whether or not connections extended from calling stations of an interconnect PABX through a telephone utility network to called stations have been completed.

For many years in the past, substantially all telephone facilities (including a PABX) situated on the premises of a subscriber of a telephone utility were provided by and were under the control of the telephone utility. In this case, charges for metered local calls and/or long-distance for toll calls made from any calling station of a telephone subscriber is determined by the telephone utility using solely telephone utility equipment.

In some cases, it is desirable to individually bill a user who uses a calling station of a PABX who makes a call through the telephone utility network to a called station, rather than to merely to be able to bill the PABX subscriber. One obvious example of such a case is that of a hotel or motel PABX, in which it is essential that the individual hotel or motel guest be billed. Another example is a business organization with different profit/loss centers. Telephone utilities have developed, for their own use, telephone systems capable of metering local calls and/or charging for long-distance toll calls made from calling stations of such a PABX. By way of examples, such PABX billing telephone systems are disclosed in U.S. Pat. No. 3,721,769, which issued on Mar. 20, 1973 to Krock et al. (which is assigned to GTE Automatic Electric Laboratories Inc.) and in U.S. Pat. No. 4,090,034, which issued May 16, 1978 to Moylin (which is assigned to Bell Telephone Laboratories).

As known in the telephone art, there are several well known audible signals which are returned to the calling-station user. These audible signals include, among others, dial tone, all-trunks busy, called-station busy and ring-back. Each of these audible signals is distinctive and its call-status meaning is well known and easily recognized by calling-station telephone users. However, not all types of call-status signals are returned to the user of a calling telephone station. For instance, when a telephone connection is extended from a calling station through a telephone utility network to a called station, the called station, on going off-hook, returns an answer signal (commonly known as answer supervision) to the telephone utility network. This answer signal, which is a call-station signal indicative of a completed extended connection to the called station, is available to the telephone utility for determining the start of the time-charge period for either a metered local call or a long-distance toll call made from a calling station of a calling subscriber. However, this answer signal, which is returned from a called station to the telephone utility network, is not commonly further returned or made available by the telephone utility network to any of the equipment (including a PABX) situated at the calling subscriber's premises.

As long as the telephone utility network is the provider of a telephone subscriber's PABX, it is not essential that the answer signal returned to the telephone utility network be further returned to the PABX (although it might be less costly if the answer signal were available at the PABX). However, recently telephone subscribers have been installing on their premises so-called interconnect telephone equipment which is not furnished by the telephone utility. In the case of an interconnect PABX, no answer signal is returned to the interconnect PABX in response to the completion of the extension of a connection from a calling station of the PABX through the telephone utility network to a called station. How, then, can the possessor of an interconnect PABX (e.g., hotel or motel operator, a business owner, etc.) determine the proper charge time period for a metered local call or a long-distance toll call made by a user (hotel or motel guest, business employee, etc.) of a calling station of the interconnect PABX through the telephone network to a called station?

Currently, the answer to this question is to make a tentative assumption that the extension of a connection, from an interconnect PABX calling station through the telephone utility network to a called station, is completed, so that in all cases a charging time period is started. If the charging time period starts a given few seconds following the dialing of the last digit by the calling station and lasts a predetermined short interval (e.g., 20 seconds) without the calling station going on-hook, the tentative assumption is made permanent and a charge for the metered or long-distance toll call is made to the user of the calling station of the interconnect PABX. However, if the calling station goes on-hook within the short interval (e.g., 20 seconds), the tentative assumption that the extended connection has been completed is reversed and the charge time period therefor is cancelled.

While statistically this current solution is reasonably accurate, it is plain that there are occasions when (A) charges are made for telephone calls in which the extension of connection to the called station has never been completed (e.g., whenever a calling station user stays off-hook for more than 20 seconds despite the fact that a busy signal or a ring-back signal is returned continually during the entire interval in which the calling station user is in an off-hook condition), and (B) no charge is made to a calling station user of the interconnect PABX when the total time for the completion of the completed extended connection plus the conversation time period is less than the predetermined interval (e.g., less than 20 seconds). This is particularly a problem where short data calls may be made, information exchange performed and the call terminated (e.g. credit verification).

The present invention is directed to an improved technique available at the interconnect PABX for more accurately determining whether or not a connection extended from a calling station of the interconnect PABX through a telephone utility network to a called station has been completed, despite the fact that no answer signal is returned from the called station to the interconnect PABX in response to the completion of the extension of a connection thereto. More specifically, in accordance with principles of the present invention, improved apparatus forming part of the interconnect PABX decides whether or not an extended connection through the telephone utility network to the called station has been completed. The improved apparatus comprises a busy signal detector for deriving a first output in response to a return of an audible busy signal;

a ring-back signal detector for deriving a second output in response to a return of an audible ring-back signal; switch means for deriving a third output indicative of whether a calling station of the interconnect PABX is in an off-hook condition or is in an on-hook condition; and connection complete or incomplete decision logic means having the first, second and third outputs applied as respective inputs thereto for (1) deriving a first control signal indicative of an incomplete extended connection in response to either (a) the indication by said first output of the existence of an audible busy signal or (b) the indication by the second and third outputs of the occurrence of a calling station on-hook condition that occurs at the end of a calling station off-hook condition interval during which an audible ring-back signal occurs and thereafter continues to occur until the end of the interval, and for (2) deriving a second control signal indicative of a complete extended connection in response to an audible ring-back signal that occurs during the interval, but which terminates prior to the end of the interval, so that the calling station remains in an off-hook condition for a period of time after the audible ring-back signal has terminated.

Figure 1:
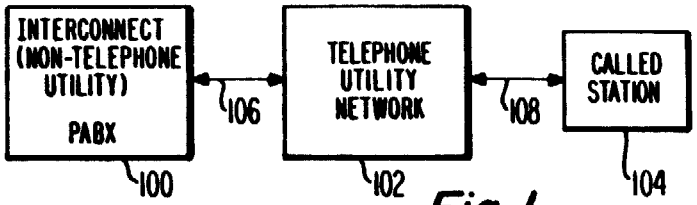
FIG. 1 is a block diagram illustrating the relationship among an interconnect (non-telephone utility) PABX, a telephone utility network and a called station that is not part of the aforesaid interconnect PABX (but which may or may not be part of another interconnect or non-interconnect PABX)

Referring to FIG. 1, there is shown in block diagram interconnect (non-telephone utility) PABX 100, telephone utility network 102 and called station 104 to which a connection may be extended from a calling station of PABX 100 through telephone utility network 102. More specifically, interconnect PABX 100, in response to the dialing of a predetermined access digit by a calling station thereof, extends a connection over a telephone line 106 from that calling station of PABX 100 to telephone utility network 102. As is usual, telephone utility network 102 returns a dial tone over telephone line 106 to the calling station of PABX. The calling station which may be either a rotary dial telephone or a push-button dial telephone) forwards connection-extending dialed digit signals over telephone line 106 to telephone utility network 102. Telephone utility network 102, in response to these dialed digit signals, extends a connection over telephone line 108 to a called station 104 (which called station may be anywhere in the world and may or may not be part of another PABX). Should any of the facilities of telephone utility network 102 be busy or should called station 104 itself be busy, telephone utility network 102 returns an audible all-trunks busy signal or an audible called-station busy signal over telephone line 106 to PABX 100. Assuming that neither telephone utility network 102 or called station 104 is busy, telephone utility network 102 forwards a ring signal to called station 104 over telephone line 108, while, at the same time, returning an audible ring-back signal over telephone line 106 to PABX 100. Should called station 104 be answered (i.e., go off-hook), an answer signal is returned to telephone utility network 102 over telephone line 108. However, telephone utility network 102 does not further return an answer signal over telephone line 106 to PABX 100. Thus, in summary, the only control signals returned by telephone utility network 102 to PABX 100, in response to making a call to called station 104 are those that can be returned over an audible connecting path, such as dial tone, an audible busy signal and an audible ring-back signal.

Figure 2:
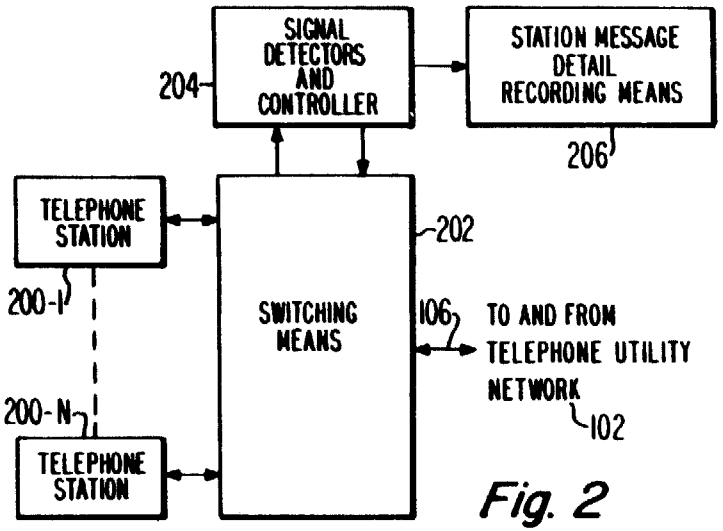
FIG. 2 is a functional block diagram of one typical embodiment of an interconnect PABX.

FIG. 2 is a functional block diagram of one typical embodiment of interconnect PABX 100. PABX 100 includes a plurality of telephone stations 200-1 . . . 200-N (where N is a plural integer). Each of telephone stations 200-1 . . . 200-N can comprise a standard dial telephone, or, alternatively, some other type of terminal equipment, such as a teletype, a data phone, an on-line computer, etc. In any event, telephone stations 200-1 . . . 200-N are associated with switching means 202. Also associated with switching means 202 is signal detectors and controller 204. Signal detectors and controller 204 has access to station message detail recording means 206. As usual in a PABX, any one calling one of telephone stations 200-1 . . . 200-N can extend a connection through switching means 202 to any called one of telephone stations 200-1 . . . 200-N by dialing the extension number of the called station of PABX 100. In response to this dialing, switching means 202 is operated by the controller of block 204 to extend the connection to the called telephone station 200-1 . . . 200-N of PABX 100. Should any one calling one of telephone stations 200-1 . . . 200-N desire to extend a call connection through telephone utility network 102, a predetermined access digit is dialed, which causes switching means 202 to be operated by the controller 204 to extend a connection to telephone utility network 102 from that calling one of telephone stations 200-1 . . . 200-N through telephone line 106. Block 204 includes signal detectors for selectively detecting various audible signals forwarded thereto through switching means 202 from telephone stations 200-1 . . . 200-N and also from telephone utility newtwork 102 over telephone line 106. These audible signal detectors may include audible dialed digit signals (in the case of PABX push-button dial telephones), but always include audible busy signal and ring-back signal detectors. Also included in block 204 are signal detectors for detecting the on-hook/off-hook condition of each of telephone stations 200-1 . . . 200-N.

Block 204 in combination with block 206, includes means for determining and recording information required to charge an individual user of PABX 100 for metered local calls and/or long-distance toll calls extended through telephone utility network 102. In some cases (such as in the case of a hotel or motel PABX) each of telephone stations 200-1 . . . 200-N is assumed to be a user. In other cases (such as in the case of a business PABX) the user (such as an employee) may have a personal identification number which is dialed by him whenever he makes a charge call from any one of calling stations 200-1 . . . 200-N. In any event, information required to charge for a call includes the charge time period of the call (i.e., the portion of the calling-station off-hook interval that extends from the start of charging for a call until the calling-station goes on-hook) and, in the case of a long-distance toll call, the area and office codes of the called station. Block 204 and/or block 206 contain conventional toll-ticketing equipment for measuring the length of the charge time period, determining the charge rate for a toll call and recording in station message detail recording means 206 details of each charged telephone call. These details also can include the time of day, the dialing number of the called station, total number of called facilities used, etc.

PABX equipment for performing the functions so far described for interconnect PABX 100 of FIG. 2 is well known in the art and includes the PABX equipment disclosed in each of the aforesaid U.S. Pat. Nos. 3,721,769 and 4,090,034. What makes interconnect PABX 100 different from the telephone-utility provided PABX equipment of the prior art is that interconnect PABX 100 has no way of ever having returned thereto answer signal information (as do some of the telephone-utility provided PABX equipments of the prior art) for determining the occurrence of the start of a charge time period. In order to accomplish this function, signal detectors and controller 204 of interconnect PABX 100 includes the charge-timing-period start-control apparatus shown in block diagram form in FIG. 3.

Figure 3:
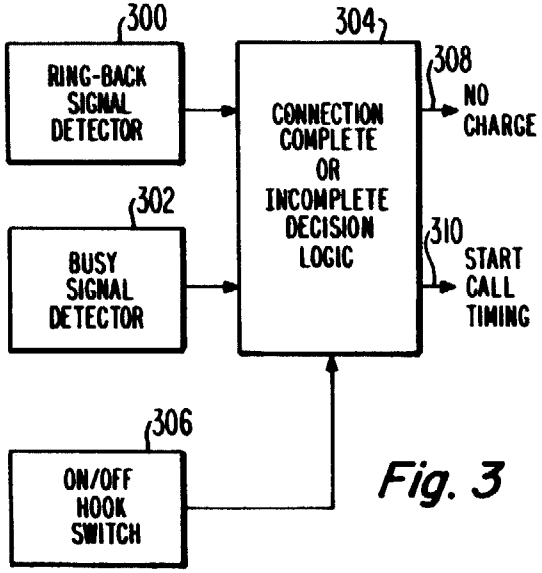
FIG. 3 illustrates a block diagram of charge-timing-period start-control apparatus incorporating the principles of the present invention.

Referring to FIG. 3 there is shown ring-back signal detector 300 and busy signal detector 302, which respond, respectively, to an audible ring-back signal and to an audible busy signal returned from telephone utility network 102 over telephone line 106 (which audible signals are forwarded by switching means 202 to block 204). Ring-back signal detector 300, in response to the detection of an audible ring-back signal, provides a first output which is applied as a first input to call complete or incomplete decision logic 304. Busy signal detector 302, in response to the detection of an audible busy signal, provides a second output which is applied as second input to call complete or incomplete decision logic 304. On/off-hook switch 306 produces a third output indicative of the on-hook or the off-hook condition of the particular calling station of PABX 100 attempting to extend a connection through telephone utility network 102 to a called-station 104. The third output from on/off-hook switch 306 is applied as a third input to call complete or incomplete decision logic 304. Call complete or incomplete decision logic 304 can take the form of a hard-wired logic circuit or, alternatively, it can take the form of a software programmed signal processor. In any event, call complete or incomplete decision logic is selectively responsive to the respective first, second and third inputs thereto from ring-back signal detector 300, busy signal detector 302 and on/off-hook switch 306 to logically decide either a first control output 308 therefrom indicative of "no charge" or a second control output 310 therefrom indicative of "start-call timing." A logical relationship between the respective "no charge" and "start call timing" outputs from call complete or incomplete decision logic 304 and the condition of each of the respective first, second and third inputs thereto is shown in the following table:

TABLE I

| | Condition | Output |
|---|---|---|
| 1 | Busy signal detected | No-charge |
| 2 | Ring-back signal detected continually until "on-hook" occurs | No-charge |
| 3 | Ring-back signal detected followed by a termination of ring-back signal while "off-hook" remains | Start call timing (upon ring-back termination) |

Despite the fact that the interconnect PABX 100 never has an answer signal returned to it from telephone utility network 102, it can be seen from the above table that call complete or incomplete decision logic 304 is able to make use of the audible ring-back signal or the audible busy signal (which are returned to PABX 100 from the telephone utility network 102) in a logical manner to determine quite accurately (i.e., on the basis of very good circumstantial evidence) whether or not the extended connection through telephone utility network 102 to a called station has, in fact, been completed. This, in turn, permits the start of timing for charging purposes to be determined much more accurately than was heretofore possible in the case of an interconnect PABX, which does not have available to it the actual answer signal returned from the called-station.

What is claimed is:

1. In an interconnect PABX which includes means capable of (A) extending a telephone connection from respective calling telephone stations of said interconnect PABX through a telephone utility network to respective called telephone stations, (B) receiving a returned audible busy signal in response to either said network or a called station being busy, and (C) receiving a returned audible ring-back signal when a called station is ringing; an answer signal returned by a called station to said network in response to that called station going off-hook being unavailable to said interconnect PABX, said answer signal being indicative of the extended telephone connection to that called station being completed; improved apparatus forming part of said interconnect PABX for deciding whether or not an extended connection through said telephone network to a called station has been completed, said apparatus comprising:

a busy signal detector for deriving a first output in response to a return of said audible busy signal;

a ring-back signal detector for deriving a second output in response to a return of said audible ring-back signal;

switch means for deriving a third output indicative of whether a calling station of said interconnect PABX is in an off-hook condition or is in an on-hook condition; and connection complete or incomplete decision logic means having said first, second and third outputs applied as respective inputs thereto for (1) deriving a first signal indicative of an incomplete extended connection in response to either (a) the indication by said first output of the existence of an audible busy signal or (b) the indication by said second and third outputs of the occurrence of a calling-station on-hook condition that occurs at the end of a calling-station off-hook condition interval during which an audible ring-back signal occurs and thereafter, continues to occur until said end of said interval, and for (2) deriving a second control signal indicative of a complete extended connection in response to an audible ring-back signal that occurs during said interval, but which terminates prior to said end of said interval, so that the calling station remains in an off-hook condition for a period of time after the audible ring-back signal has terminated.

2. In said interconnect PABX defined in claim 1, which further includes a station message detail record means for recording toll charges of toll telephone calls extended from a calling station of said interconnect PABX through said telephone utility network to called stations in accordance with the area and office codes of any particular called station and the duration of a time period of a toll telephone call from a particular interconnect PABX calling station and that particular called station; and wherein said station message detail record means is coupled to said improved apparatus and is responsive to the occurrence of said second control signal for starting said time period and is responsive to said particular calling station going into an on-hook condition at the end of said interval for ending said time period.

*3. In interconnect telephone equipment which includes means capable of (A) extending a telephone connection from a calling telephone station of said interconnect telephone equipment through a telephone utility network to respective called telephone stations, (B) receiving a returned audible busy signal in response to either said network or a called station being busy, and (C) receiving a returned audible ring-back signal when a called station is ringing; an answer signal returned by a called station to said network in response to that called station going off-hook being unavailable to said interconnect telephone equipment, said answer signal being indicative of the extended telephone connection to that called station being completed; improved apparatus forming part of said interconnect telephone equipment for deciding whether or not an extended connection through said telephone network to a called station has been completed, said apparatus comprising:*

*a busy signal detector for deriving a first output in response to a return of said audible busy signal;*

*a ring-back signal detector for deriving a second output in response to a return of said audible ringback signal;*

*switch means for deriving a third output indicative of whether a calling station of said interconnect telephone equipment is in an off-hook condition or is in an on-hook condition; and*

*connection complete or incomplete decision logic means having said first, second and third outputs applied as respective inputs thereto for (1) deriving a first signal indicative of an incomplete extended connection in response to either (a) the indication by said first output of the existence of an audible busy signal or (b) the indication by said second and third outputs of the occurrence of a calling-station on-hook condition that occurs at the end of a calling-station off-hook condition interval during which an audible ring-back signal occurs and thereafter, continues to occur until said end of said interval, and for (2) deriving a second control signal indicative of a complete extended connection in response to an audible ring-back signal that occurs during said interval, but which terminates prior to said end of said interval, so that the calling station remains in an off-hook condition for a period of time after the audible ring-back signal has terminated.*

* * * * *

UNITED STATES PATENT AND TRADEMARK OFFICE
CERTIFICATE OF CORRECTION

PATENT NO. : Re. 32,263

DATED : October 7, 1986

INVENTOR(S) : MURRAY FRED KAMINSKY

It is certified that error appears in the above-identified patent and that said Letters Patent is hereby corrected as shown below:

Title Page, {54}, change title from "CHARGE TIME START CONTROL FOR INTERCONNECT PABX" to --CHARGE TIME START CONTROL FOR INTERCONNECT TELEPHONE EQUIPMENT--.

Title Page, {57}, change first line in Abstract from "In an interconnect {PABX}, *telephone equipment*" to --In interconnect {PABX} *telephone equipment*,--.

Column 1, line 2, change title from "CHARGE TIME START CONTROL FOR INTERCONNECT PABX" to --CHARGE TIME START CONTROL FOR INTERCONNECT TELEPHONE EQUIPMENT--.

Column 4, line 61, after "off-hook" insert --time--.

Signed and Sealed this

Twentieth Day of January, 1987

*Attest:*

*Attesting Officer*

DONALD J. QUIGG

*Commissioner of Patents and Trademarks*